Aug. 19, 1969   HIDEO SAGARA   3,462,204
SHAFT BEARING
Filed Aug. 26, 1966
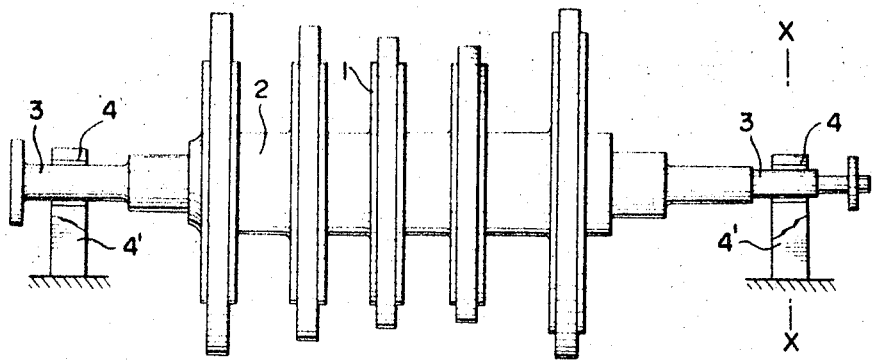
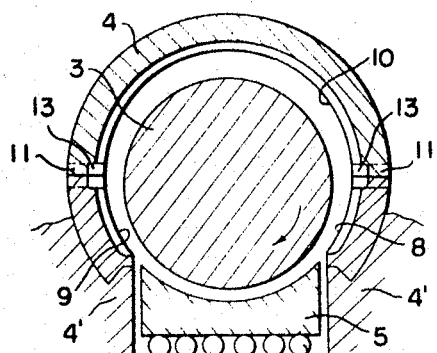
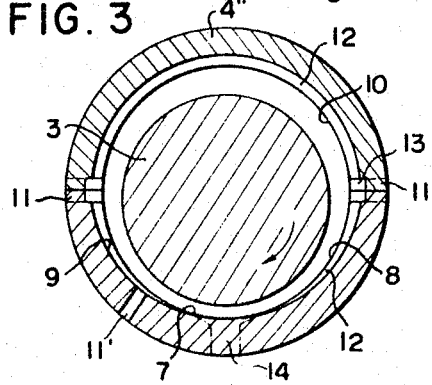
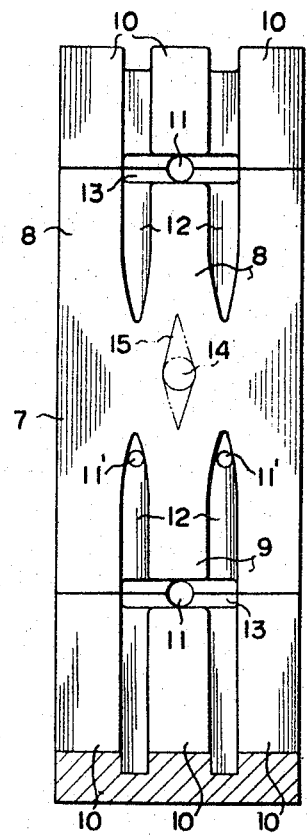
INVENTOR.
HIDEO SAGARA
BY M. Glurand Toren
ATTORNEYS

United States Patent Office 3,462,204
Patented Aug. 19, 1969

3,462,204
SHAFT BEARING
Hideo Sagara, Hiroshima-shi, Japan, assignor to Mitsubishi Jukogyo Kabushiki Kaisha, Tokyo, Japan
Filed Aug. 26, 1966, Ser. No. 575,304
Claims priority, application Japan, Aug. 27, 1965,
40/52,241; Oct. 5, 1965, 40/60,953; June 2,
1966, 41/35,581
Int. Cl. F16c 1/24, 17/16, 13/02
U.S. Cl. 308—122                                  11 Claims

ABSTRACT OF THE DISCLOSURE

A shaft bearing rotatably supporting a shaft journal of a high speed rotor embraces the journal and has its bearing surface spaced radially therefrom to provide a radial clearance for the supply of fluid under pressure between the bearing surface and the journal. The bearing surface includes an arcuately extending pressed portion disposed beneath the journal and toward which the journal is urged by gravity and other external forces acting transversely of the journal in the direction of the pressed portion. The arrangement is such that the journal can move freely in any direction, other than toward the pressed portion, a greater extent than toward the pressed portion so that, when the rotor is unbalanced and rotating at a speed in excess of 3000 r.p.m., the journal center vibrates laterally of the bearing through a path having a radius of longitudinal curvature whose lower limit is larger than the radial clearance.

Background of the invention

This invention relates to shaft bearings and, more particularly, to a novel shaft bearing for high speed rotors and capable of inhibiting any appreciable vibration of the rotor.

The present invention is directed to a shaft bearing for rotors operating at speeds in excess of several thousand r.p.m., such as, for example, a turbine directly connected with a gas blower or a geared turbine driving the propeller of a ship. The rotors of rotary machines of this type rotate at very high speeds at maximum output and at somewhat slower speeds for reduced outputs, and furthermore may continuously be driven at different speeds over long periods of time.

In high speed rotary machines of the type mentioned and in order to protect the rotor from critical vibration during rotation thereof, it has hitherto generally been the practice to design the rotor so that when the rotor is supported in shaft bearings, a lateral primary critical speed, hereinafter called the "critical speed," is higher than the maximum working speed of the rotary machine. However, even if the critical speed is in excess of 120% of the maximum working speed, and has, for instance, a designed value of 14,000 r.p.m., the rotor, whose shaft journals are supported by oil-lubricated plain bearings, in some cases undergoes critical vibration below 6,000 to 7,000 r.p.m. in actual operation. This is due to the oil films existing at the bearings, and because of the flexibility of the bearing stands supporting the bearings. The amplitude of such vibration can be controlled, so as to avoid operational difficulties, by increasing the vibration-damping property of the oil films and by ascertaining that the rotor is dynamically balanced. If these criteria are observed, it is possible to design a rotary machine without regard to the relationship between the critical speed and the maximum working speed of the rotor.

However, in the case of a steam turbine, unbalancing of the rotor is inevitable, owing either to a permanent strain naturally occurring during a long-time period of operation or to a temporary strain developing during starting or during a stoppage. If the critical speed is higher than the maximum working speed, then the rotor and its bearings are subjected to substantial vibration because the centrifugal force due to the dynamic unbalance of the rotor is proportional to the square of the speed, so that the maximum value of the centrifugal force occurs at the highest speed.

If the bearing is constructed so as to be able to dampen vibrations and if the critical speed is determined within the range of the working speeds, then a critical vibration occurs during operation. In this case, a reaction force of the bearing acts on a shaft journal and consequently the main mass of the rotor is caused to swing about the shaft journal. The resultant deflection of the shaft results in the development of a high centrifugal force which, in turn, causes the rotor and the bearing to vibrate substantially. In order to prevent secondary troubles due to these vibrations, it has been necessary to provide a vibration-proof machine and a vibration-proof bearing. Additionally, it has been necessary, when the rotor is out of dynamic balance, to operate the machine at speeds differing from either the maximum working speed or the critical speed.

An object of the present invention is to provide a bearing for high speed rotary machines and which is free of the disadvantages mentioned above.

Another object of the invention is to provide a novel bearing for high speed rotors in which the bearing, supporting a shaft journal, has a sufficient radial clearance for supply of a fluid between the bearing and the journal, and in which the pressure surface of the bearing is so formed that it allows the center or axis of the journal to move freely in any direction, other than toward such pressure surface, a greater extent than toward the pressure surface, when the rotor is not dynamically in balance, so that the rotor journal may substantially freely describe a vibration path A–B having a radius of curvature $r$ whose lower limit is larger than the radial clearance C between the bearing and the journal, as shown in FIGS. 2 and 3 of the accompanying drawings.

A further object of the invention is to provide a novel bearing for a high speed rotor, as just rescribed, in which the lower limit of said radius of curvature $r$ is equal to 0.15 mm. and in which, when the critical speed of the rotor is at or below 7,000 r.p.m. and the lower limit of of the working speed of the rotor is equal to or in excess of 3,000 r.p.m., the lower limit is at least 0.10 $(3000/$ lower limit of working speed in r.p.m.$)^2$ mm. >0.05 mm.

Still another object of the invention is to provide a novel bearing for high speed rotors in which the bearing allows the main mass of the rotor to have a pendulum motion whose natural vibration speed is very low and below either the lower limit of the working speed or below 3,000 r.p.m.

A further object of the type just mentioned in which, even during substantial dynamic unbalance of the rotor, the bearing inhibits vibration of the main mass of the rotor when the latter is rotating at speeds in excess of 3,000 r.p.m.

Yet another object of the invention is to provide a shaft bearing of the type just mentioned in which, when the rotor is operating at speeds below 3,000 r.p.m., and even though vibration happens to occur at the natural vibration speed, the force causing the vibration is very slight.

A further object of the invention is to provide a shaft bearing of the type just mentioned in which, even if the amplitude of the vibration increases and even if it extends over half of the circumference of the pressure surface of the bearing, the journal, near the ends of the vibration path, is separated from the pressure surface of the bearing due to external forces so that the journal may move freely in the bearing without continuing the pendulum motion, whereby the bearing will not effect a critical vibration of the rotor.

Still another object of the invention is to provide an oil-lubricated plain bearing or a static-pressure-fluid bearing including an external force bearing surface, hereinafter called the "pressed portion," and against which the journal of the shaft engages or presses due to gravity or to external forces acting transversely or vertically on the rotor, and which pressed portion has an inner surface extending through about a quarter of the entire inner circumference of the bearing.

A further object of the invention is to provide an oil-lubricated plain bearing or static-pressure-fluid bearing of the type just mentioned in which such pressed portion is bodily displaceable relative to the remainder of said bearing and movable through the medium of a spring or rollers engaged therewith, and can vibrate in a direction perpendicular to the direction of the external forces at a unilateral amplitude in excess of 30% of the radial clearance C of the bearing.

Yet another object of the invention is to provide a bearing of the type just mentioned in which the pressed portion is made so elastically flexible that the amplitude of downward displacement of the inner surface under the influence of gravity acting on the rotor or the influence of external forces acting on the rotor is, at both ends of the pressed portion, in excess of 30% of the bearing radial clearance C and is less at the middle of the pressed portion.

A further object of the invention is to provide a static-pressure fluid bearing of the type mentioned in the preceding paragraph in which, by adjusting both the pressed portion and the parameters of the fluid supplied to the bearing, the shaft journal, when the force is exerted thereon, has a play which at the middle of the pressed portion, is equal to 50% of the bearing radial clearance C and, at other points, is equal to about 10% of the bearing radial clearance C so that the center of the journal may vibrate in a substantially planar path at any working speed of the rotor.

Another object of the invention is to provide an oil-lubricated plain shaft bearing in which an oil film at the middle of the above-mentioned pressed portion is thicker than it is at any other portion of the bearing inner surface so that the radius of curvature of a path of vibration of the center of a journal supported in the bearing is larger than the radial clearance of the bearing, and in which, if the thickness of the oil film is equal to 50% of the bearing radial clearance at the middle of the above-mentioned pressed portion and the thickness of the oil film at other portions of the bearing inner surface is equal to 10% of the bearing radial clearance, then the path of vibration becomes planar.

A further object of the invention is to provide a shaft bearing of the type mentioned in the preceding paragraph in which, if the above-mentioned difference in the percentage thickness of the oil film cannot be easily obtained because of a low operating speed, a lower limit of the radius of curvature of the path of vibration at a rotor speed of 3,000 r.p.m. is variable in the range of 0.15 mm. to 0.05 mm. according to both the critical speed and the lower limit of the working speed of the rotor and in which, if the speed of the rotor is increased, the oil film is increased in thickness at the middle of the above-mentioned pressed portion without any substantial increase in thickness of the oil film at the other portions of the bearing surface so that the path of vibration becomes planar.

Still another object of the invention is to provide a shaft bearing of the type hitherto mentioned in which the path of vibration of the center of a shaft journal supported in the bearing, when forced against the pressed portion of the bearing, is controlled, but in which the journal, when biased toward other portions of the bearing surface, is free of a substantial reaction force.

For an understanding of the principles of the invention, reference is made to the following description of typical embodiments thereof as illustrated in the accompanying drawings.

In the drawings:

FIG. 1 is a side elevation view showing a bearing in accordance with the present invention as used to rotatably support the rotor of a steam turbine driving a gas blower;

FIG. 2 is a transverse sectional view taken along the line X—X of FIG. 1;

FIG. 3 is a view similar to FIG. 2, but illustrating a modified form of the bearing; and FIG. 4 is a developed view showing the inner surface of the bearing illustrated in FIG. 3.

In advance of a detailed reference to the drawings, it will be well to explain the functions and operation of a bearing in accordance with the present invention. If a rotating rotor having a journal forced against a bearing under the influence of external forces happens, at its main mass, to become dynamically unbalanced, then the main mass has a pendulum action while the center or axis of the journal, engaged with the pressed portion of the bearing, describes a path of vibration A–B which is substantially either a curved surface having a radius of curvature larger than the bearing radial clearance C and larger than 0.15 mm., or which is a curved surface having a radius of curvature larger than 0.1 mm. and 0.05 mm., respectively, in accordance with the critical speed and the lower limit of the working speed of the rotor. The natural vibration speed $N_{CRB}$ of the rotor in the pendulum motion may be derived as will now be explained. If $g$ is the force of gravity acting on the rotor as the only external force, R is the radius of vibration or swinging of the main mass of the motor in mm., $r$ is the radius of curvature of the path of vibration of the center of the journal in mm., Y is the displacement in mm. of the center of the rotor main mass relative to the journal due to the deflection of the rotor shaft, and $N_{CR}$ is the critical speed of the rotor in r.p.m., then the following relation holds true:

$$N_{CRB} = \frac{60}{2\pi}\sqrt{g/R} \doteqdot 1{,}000\sqrt{1/R} \doteqdot 1{,}000\sqrt{1/r+Y} \quad (1)$$

$$Y = g(60/2\pi N_{CR})^2 \doteqdot (1{,}000/N_{CR})^2 \quad (2)$$

If $R=\infty$, then $N_{CRB}=0$ and, if $R=0.15$ mm., then $N_{CRB}=2{,}600$ r.p.m. If $N_{CR}=7{,}000$ r.p.m., then $Y=0.02$ mm. In this case, if $r=0.10$ mm., then $$R=r+y=0.10+0.02=0.12 \text{ mm.}$$

and $N_{CRB}=29{,}000$ r.p.m. If the lower limit of working speed of the rotor is 4,500 r.p.m., then $$r=0.10(3{,}000/4{,}500)^2=0.05 \text{ mm.}$$

Hence $R=r+y=0.05+0.02=0.07$ mm., and $$N_{CRB}=3{,}800 \text{ r.p.m.}$$

Because $N_{CRB}$ is less than 3,000 r.p.m., or below the lower limit of working speed, the main mass of the rotor scarcely vibrates when the rotor has a speed in excess of these speeds. Only the journal vibrates, although very slightly, at a unilateral amplitude almost equal to the deviation of the center of gravity, due to the dynamic unbalancing, of the main mass of the rotor. If the radius of curvature of the path of vibration R is larger than such deviation, then the force acting on the bearing becomes very small.

On other hand, when the lower limit of working speed of the rotor is below 3,000 r.p.m., and even if the working speed by chance is equal to $N_{CRB}$, then the absolute magnitude of the unbalance of the rotor is small because a high speed rotor is small and light. Furthermore, a force causing a vibration at a rotor speed below 3,000 r.p.m. is very small, and therefore vibrations of the rotor and of the bearing are slight. Even if the magnitude is large, the rotor, when its journal vibrates on the pressed portion of the bearing at a unilateral amplitude equaling in excess of a quarter of the inner circumference of the bearing, can be protected from a critical vibration because the journal has a free motion relative to the bearing owing to the external forces which separate the journal from the inner surface of the bearing in the vicinity of the ends of the vibration path.

In every bearing embodying the present invention, the main mass of the rotor, when the journal rotates under the influence of gravity and other external forces acting transversely on the rotor in a vertical direction, has a pendulum motion whose natural vibration speed is low. Even if the rotor happens to become dynamically unbalanced, vibrations of the main mass of the rotor and the bearing caused by the journal and in the direction of motion, are lessened. However, the main mass of the rotor also vibrates in a direction perpendicular to the direction of said motion, due to centrifugal force and also due to the reaction force of the bearing, both of which forces occur due to the dynamic unbalance of the rotor. The natural vibrating speed of this vibration is below the critical speed of the rotor because of the flexibility of a fluid located on the pressed portion of the bearing. If the rotor rotates at the natural vibration speed mentioned above, then the rotor is going to have a critical vibration. However, as the amplitude increases, the path of the pendulum motion is changed, and in the vicinity of the midpoint of such motion, the journal is caused to move upwardly away from the pressed portion of the bearing. Thus, the journal has a free motion in the bearing and critical vibration is prevented.

If the rotor rotates at higher speeds, then the rotor main mass hardly vibrates because of the flexibility of the fluid between the rotor shaft and the pressed portion of the bearing. On the other hand, if the rotor rotates at lower speeds, then a force causing a vibration due to centrifugal force resulting from the dynamic unbalance of the rotor becomes slight, and consequently the bearing hardly vibrates. As will be evident, it is desirable to make thicker the fluid film on the pressed portion of the bearing at mentioned speeds and to make thinner the fluid film on the surfaces other than the said pressed portion, in order to flatten the vibration path A-B of the journal center and to obtain a unilateral amplitude of the vibration of the said journal at least equaling twice the probable deviation of the center of gravity of the main mass of the rotor, without encountering any reaction force in excess of the weight of the rotor. The said unilateral amplitude of the vibration is, for example, in excess of 0.035 mm.

In order to ascertain the parameters and the operational effects of the bearing of the present invention, it is advisable that a rotor be turned tentatively, in a dynamically unbalanced state, at various speeds and at a deviation of the center of gravity of the main mass of the rotor ranging from 0.005 to 0.015 mm. By so doing, the paths of vibrations of the centers of a fore and of a rear journal can be measured using an electronic vibrameter and, if necessary, the radial clearance of the bearing, the dimensions of the portion of the bearing and the parameters of the pressurized lubricant can be subjected to corrections.

Referring to FIG. 1, a bearing embodying the principles of the present invention is illustrated as supporting a horizontally oriented rotor 1 of a steam turbine for driving a blower. The main mass of the rotor is indicated at 2, and the rotor shaft has journals 3 which are supported in bearings 4 mounted on bearing stands 4', the bearings 4 being constructed in accordance with the present invention. Bearings 4 are oil-lubricated plain bearings and there is a radial play between each bearing and the associated journal 3, the radial clearance amounting to 0.06 mm. Each bearing 4 is lined with wear-resisting white metal.

Gravity is the only external force acting on rotor 1, and journals 3 are forced against bearings 4 due to the external forces. One of the design speeds of the rotor is a maximum operating speed of 10,000 r.p.m., and the other design speed of the rotor is a critical speed of 3,000 r.p.m.

Referring to FIG. 2, the lower middle part of bearing 4 is indicated at 5 as separated from the rest of bearing 4 and containing the above-mentioned pressed portion. The circumferential extent of the surface of the pressed portion corresponds to a quarter of the entire inner circumference of bearing 4. Bearing part 5 is movably supported by rollers 6, which can be six in number for example. Part 5 can vibrate freely, to the right and left as illustrated in FIG. 2, at a unilateral amplitude of 0.02 mm. Fixed pressure surfaces of the bearings 4 are designated at 8, 9 and 10. Oil supplied under pressure at ports 11 lubricates all the surfaces including the pressed portion on bearing part 5. The gaps between bearing part 5 and the fixed parts of bearings 4 are also filled with oil, which will dampen the impact between part 5 and the remainder of bearing 4 during vibration of part 5.

Because bearing part 5 can vibrate freely in a horizontal direction and the center of journal 3 describes the substantially planar path A-B when journal 3, urged against the pressed portion of bearing part 5 due to the gravity acting on the rotor 1, rotates, a reaction force acting on journal 3 is directed only in the direction opposite to that of the external force, namely only in an upward direction. As a result, the main mass 2 of rotor 1 does not vibrate in the horizontal direction, and journal 3 swings about main mass 2. As rotor 1 does not cause a critical vibration, bearing 4, excluding part 5, is not vibrated so that the machine operates quietly.

In the embodiment of the bearing shown in FIGS. 3 and 4, the bearing 4" has various pressure surfaces including the pressed portion 7, the lower pressure-surfaces 8 and 9 on opposite sides of pressed portion 7, and an upper pressure surface 10. Two oil grooves 12 are provided in the pressure surfaces 8, 9 and 10, and extend in a circumferential direction, as illustrated particularly in FIG. 4. There are also provided two oil grooves 13 which extend in an axial direction, as also illustrated in FIG. 4. Lubricating oil under pressure is supplied at oil ports 11 and 11', and an oil film 0.03 mm. thick, is partly produced on pressed portion 7 when journal 3 rotates at speeds in excess of 3,000 r.p.m. However, on pressure surfaces 8, 9 and 10, the oil film produced is 0.006 mm. when journal 3 is acted on by a force corresponding to the weight of rotor 1. Therefore, the center of journal 3, which is swung about main mass 2 of rotor 1, describes a path A-B which is approximately planar or flat. Journal 3 vibrates substantially without encountering any reaction force in the horizontal direction, thus obtaining the results of the present invention.

Because, in this case, it is desirable that the path of vibration A-B of the center of journal 3 be substantially planar or flat, it may be allowed, due to the fact that the designed critical speed of rotor 1 is 3,000 r.p.m. and that the rotor has sufficient flexibility, to make the oil film on pressed portion 7 thicker than that on each of the other pressure surfaces, and to make the radius of curvature of the path of vibration preferably larger than the radial clearance of bearing 4", or over 0.10 mm. If these values are adopted, then the displacement Y already defined is obtained from Equation 2;

$$Y = \left(\frac{1000}{3000}\right)^2 = 0.11 \text{ mm.}$$

From Equation 1 a value of $N_{CRB}$ is $$1,000 \times \sqrt{\frac{1}{0.21}} \fallingdotseq 2,200 \text{ r.p.m.}$$

Although the main mass 2 of rotor 1, when the rotor is operating at 3,000 r.p.m., hardly vibrates and, on the other hand, journal 3, at that speed, vibrates at a unilateral amplitude almost equal to the deviation of the center of gravity of the main mass 2 due to unbalancing of rotor 1, the unilateral amplitude decreases to become smaller than such displacement because rotor 1 is so flexible that the determined value of Y is as large as 0.11 mm. At the same time, the force which journal 3 exerts both on rotor 1 and on bearing 4″ becomes small. If the speed of rotor 1 exceeds 3,000 r.p.m., then the oil film on pressed portion 7 is increased in thickness while the oil films on the other pressure surfaces 8, 9 and 10 are not substantially increased in thickness, because these surfaces are divided by oil grooves 12 into three relatively narrow parts at whose edges the oil leakage is increased. As a result, the path of vibration, becomes substantially planar, and the force exerted by journal 3 on rotor 1 and bearing 4″ decreases. Thereby, the desired results of the present invention can be obtained.

On the other hand, if the rotor speed is below 3,000 r.p.m., then the oil film on pressed portion 7 is decreased in thickness and consequently the radius of curvature of the vibration path becomes so small that its value is approximately equal to the radial clearance of 0.06 mm. Furthermore, the natural frequency of the pendulum motion of main mass 2 becomes slightly higher. At a speed slightly below 2400 r.p.m., critical vibration is going to arise, but nevertheless the machine operates quietly because the centrifugal force due to unbalance of rotor 1 is below $\frac{1}{4}^2 = \frac{1}{16}$ of that at a maximum working speed of 10,000 r.p.m. and because the force causing a vibration, and exerted by journal 3 on bearing 4″ and main mass 2, is very small. If a deviation of the center of gravity due to unbalancing of rotor 1 is in excess of 0.01 mm. and therefore, owing to the centrifugal force, a vibration effecting force due to the pendulum motion of the rotor 1 becomes so large that an amplitude of the vibration of journal 3 beyond the entire range of pressure surfaces 7, 8 and 9 and extends into upper pressure surface 10, then the force of gravity $g$ acting on rotor 1 exerts a journal-separating action on journal 3 relative to pressure surface 10. As a result, journal 3 moves away from pressure surface 10 in the vicinity of the end points of the path of vibration, so as to move freely in bearing 4″ without containing the pendulum motion and to fall toward the pressed portion 7 or the pressure surfaces 8 and 9. Because the oil films on surfaces 8, 9 and 10 are relatively thin, the unilateral amplitude at which journal 3 can move freely, without encountering any reaction force corresponding to more than the weight of rotor 1, is almost equal to the bearing radial clearance of 0.06 mm. The force which journal 3 exerts on rotor 1 and on bearing 4″ or bearing stand 4′ consequently is small and does not have a fixed direction and phase. As a result, a critical vibration does not occur at these parts.

If journal 3 is floated away from pressed portion 7 due to the high pressure of the supply of lubricating oil at an oil port 14 to an oil groove 15 provided in pressed portion 7, then an effect similar to that in a static-pressure fluid bearing is obtained. Even at speeds below 3,000 r.p.m., the path of vibration of journal 3 becomes planar and consequently vibration of main mass 2 can be completely prevented in the same manner as in the case of the bearing 4 shown in FIG. 2. In the case of a vibration in a direction perpendicular to the pendulum motion of rotor 1, a critical vibration is going to occur at speeds below 3,000 r.p.m. due to the flexibility of the oil film on the pressed portion 7, since the critical speed of the rotor is fixed at 3,000 r.p.m.

As, however, the amplitude of the vibration path increases, journal 3 moves away from pressed portion 7 so as to have a free motion. Thus, the critical vibration does not occur, as in the case of operation at the speed of natural vibration of the pendulum motion. The vibration causing force which journal 3, at speeds above or below the natural vibration speed, exerts on main mass 2 or on bearing 4 or 4″ is very small. Thus it will be easily understood that the bearings 4 and 4″ of the present invention are more effective at a lower critical speed of rotor 1. If a critical speed of the rotor 1, $N_{CRB}$ is below 7,000 r.p.m. and is, for instance, equal to 6,000 r.p.m., and a lower limit of working speed is over 3,000 r.p.m. and is, for instance, equal to 3,900 r.p.m., then $$r = 0.1(3000/3900)^2 = 0.06 \text{ mm.}$$

From Equation 2, the displacement is $$Y = (1000/6000)^2 = 0.028 \text{ mm.}$$

Hence, from the Equation 1, $$N_{CRB} > 1,000\sqrt{1/0.088} = 3,400 \text{ r.p.m.}$$

In this case, therefore, if $r$ is larger than 0.06 mm., which is the radial clearance of the bearing, then the main mass 2 during operation of rotor 1 will not cause any critical vibration due to the pendulum motion, but the rotor operates quietly. The natural vibration speed of rotor 1, vibrating in a direction perpendicular to the pendulum motion, becomes below 6,000 r.p.m., a critical speed of rotor 1 because of both oil films of the bearing and the flexibility of the pressed portion 7. The same applies to the case where rotor 1 is supported by means of the bearing 4 shown in FIG. 2, so that the center of journal 3 may have a path of vibration which is approximately planar. If the oil film on movable bearing part 5 or on pressed portion 7, at the natural vibration speed or thereabouts, is specially increased in thickness and thus these parts are so flexible that a deflection due to the force corresponding to the weight of rotor 1, supported partly by the pressed portion, is approximately equal to the radial clearance of the bearing, then the natural vibration speed can be reduced below the lower limit of the working speed. If a further reduction of the natural vibration speed is desired, then rollers 6 supporting movable bearing part 5 of FIG. 2 may be replaced by a spring, or the backside or radially outer surface of the pressed portion 7 of FIG. 3 can be machined away, as at D, to increase the flexibility. Even if the natural vibration speed is over the lower limit of the working speed, and is going to cause a critical vibration during operation, such critical vibration can be prevented because journal 3 is separated from the pressure surfaces of the bearings 4 and 4″.

As described above, the invention bearing is designed to support a rotating journal operating under the force of gravity and other external forces acting on the rotor to control, by providing the pressed portion, the path of vibration of the center of the journal in a direction perpendicular to the external forces. On the one hand, the bearing is designed to allow the main mass of the rotor to have a pendulum motion whose natural vibration speed is below 3,000 r.p.m. or the lower limit of the working speed and, on the other hand, is designed to allow the journal to move freely in any direction, other than toward the pressed portion, a greater extent than toward the pressed portion. In order to obtain these effects, it is desirable to increase the radial clearance of the bearing as much as possible within allowable limits, to increase the thickness of the fluid film at the pressed portion of the journal so that it is substantially thicker than those between the journal and other portions of the bearings, and to increase the flexibility of the rotor supported in the bearings. In other words, it is desirable to reduce the primary critical speed of lateral vibration. Consequently, the invention bearing differs substantially from a pressure bearing in which a journal, urged to one side by oil pressure, is prevented from a free movement or whipping, and increased in vibration damping ability. The invention bearing further differs substantially from a tilting-pad type of bearing in which a journal placed between tilting-pad pressure surfaces is prevented from free movement or whipping, and also differs substantially from a bearing in which the oil films are of equal thickness throughout the circumference and are thinned by narrowing the pressure surfaces whereby whipping of a journal is prevented.

What is claimed is:

1. A shaft bearing comprising, in combination, a rotor having a working speed in excess of 4000 r.p.m. and including a shaft having a journal; a shaft bearing embracing said journal and having its bearing surface spaced radially from the journal a distance sufficient to provide a radial clearance; means supplying fluid under pressure to said radial clearance; and an arcuately extending pressed portion included in said bearing surface and disposed beneath said journal; said journal being urged toward said pressed portion by the force of gravity and other external forces acting transversely of said journal in the direction of said pressed portion; said pressed portion having a pressure surface extending arcuately through substantially from an eighth to a quarter of the entire circumference of the bearing surface, and having an effective bearing area, per unit of circumferential extent of the bearing surface, that is larger than that of the remainder of said bearing surface.

2. A shaft bearing, as claimed in claim 1, in which said bearing surface has at least one radially inwardly opening circumferential groove interrupted throughout said pressed portion.

3. A shaft bearing, as claimed in claim 1, in which said fluid supplying means provides high pressure fluid on said pressed portion and low pressure fluid on the remainder of said bearing surface.

4. A shaft bearing, as claimed in claim 1, in which said radial clearance provides free movement of the center of said journal through a unilateral amplitude of at least 0.035 mm. before encountering a reaction force from said bearing equal to more than the weight of said rotor acting on said journal.

5. A shaft bearing, as claimed in claim 1; said fluid supplying means providing high static pressure fluid on said pressed portion and low static pressure fluid on the remainder of said bearing surface.

6. A shaft bearing, as claimed in claim 1, in which said effective bearing areas are determined by measuring the motion of said journal under working conditions with the center of said journal vibrating freely through a path having a radius of longitudinal curvature whose lower limit is larger than 0.15 mm.

7. A shaft bearing, as claimed in claim 6, in which said lower limit of the radius of longitudinal curvature, when a lateral primary critical speed of said rotor is lower than 7000 r.p.m., is reduced to 0.10 (3000/lower limit of working speed in r.p.m.)$^2$ mm.

8. A shaft bearing comprising, in combination, a rotor having a working speed in excess of 4000 r.p.m. and including a shaft having a journal; a shaft bearing embracing said journal and having its bearing surface spaced radially from the journal a distance sufficient to provide a radial clearance; means supplying fluid under pressure to said radial clearance; and an arcuately extending pressed portion included in said bearing surface and disposed beneath said journal; said journal being urged toward said pressed portion by the force of gravity and other external forces acting transversely of said journal in the direction of said pressed portion; said pressed portion being movable relative to the remainder of said bearing surface whereby said journal can move freely in any direction, other than toward said pressed portion, more than toward said pressed portion.

9. A shaft bearing, as claimed in claim 8, in which said pressed portion is bodily displaceable relative to the remainder of said bearing surface.

10. A shaft bearing, as claimed in claim 8, in which said pressed portion is elastically movable relative to the remainder of said bearing surface.

11. A shaft bearing, as claimed in claim 8, in which said fluid supplying means provides a thick film of fluid on said pressed portion and a thin film of fluid on the remainder of said bearing surface, said thick and thin films providing for free movement of the center of said journal through a unilateral amplitude of at least 0.035 mm. before encountering a reaction force from said bearing equal to more than the weight of said rotor acting on said journal.

References Cited

UNITED STATES PATENTS

| 1,900,593 | 3/1933 | Wade | 308—122 |
| 3,124,395 | 3/1964 | Sternlicht | 308—122 |

FOREIGN PATENTS 889,194 2/1962 Great Britain.

MARTIN P. SCHWADRON, Primary Examiner

FRANK SUSKO, Assistant Examiner